(12) United States Patent
Hemer

(10) Patent No.: US 7,886,536 B2
(45) Date of Patent: Feb. 15, 2011

(54) EXHAUST-GAS TURBOCHARGER, REGULATING DEVICE FOR AN EXHAUST-GAS TURBOCHARGER AND VANE LEVER FOR A REGULATING DEVICE

(75) Inventor: Hans-Josef Hemer, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 63 days.

(21) Appl. No.: 11/265,926

(22) Filed: Nov. 3, 2005

(65) Prior Publication Data

US 2006/0112690 A1    Jun. 1, 2006

(30) Foreign Application Priority Data

Nov. 30, 2004    (DE)    ........................ 10 2004 057 864

(51) Int. Cl.
*F02D 23/00*    (2006.01)
(52) U.S. Cl. ........................................ 60/602; 415/159
(58) Field of Classification Search .................. 60/602; 415/159–166
See application file for complete search history.

(56) References Cited

U.S. PATENT DOCUMENTS

| | | | | | |
|---|---|---|---|---|---|
| 2,860,827 | A | * | 11/1958 | Egli ............................ | 415/164 |
| 3,101,926 | A | * | 8/1963 | Weber ........................ | 415/110 |
| 4,355,953 | A | * | 10/1982 | Nelson ........................ | 415/164 |
| 4,657,476 | A | * | 4/1987 | Berg ............................ | 415/48 |
| 4,659,295 | A | * | 4/1987 | Burdette et al. ............. | 417/407 |
| 4,726,744 | A | * | 2/1988 | Arnold ........................ | 417/407 |
| 4,741,666 | A | * | 5/1988 | Shimizu et al. ............. | 415/158 |
| 4,804,316 | A | * | 2/1989 | Fleury ........................ | 417/407 |
| 5,028,208 | A | * | 7/1991 | Mitsubori et al. ........... | 415/150 |
| 5,146,752 | A | * | 9/1992 | Bruestle ...................... | 60/602 |
| 5,549,449 | A | * | 8/1996 | McInerney et al. .......... | 415/177 |
| 6,050,775 | A | * | 4/2000 | Erdmann et al. ............. | 415/164 |
| 6,471,470 | B2 | * | 10/2002 | Yoshimura et al. .......... | 415/160 |
| 6,527,508 | B2 | * | 3/2003 | Groskreutz et al. ......... | 415/164 |
| 6,623,240 | B2 | * | 9/2003 | Ertl et al. .................... | 415/163 |
| 6,659,718 | B2 | * | 12/2003 | Jinnai et al. ................. | 415/164 |
| 6,699,010 | B2 | * | 3/2004 | Jinnai ......................... | 415/164 |
| 6,736,595 | B2 | * | 5/2004 | Jinnai et al. ................. | 415/164 |
| 6,763,587 | B2 | * | 7/2004 | Jinnai et al. ................. | 29/889.2 |
| 6,814,540 | B2 | * | 11/2004 | Sishtla et al. ............... | 415/150 |
| 6,916,153 | B2 | * | 7/2005 | Boening ..................... | 415/163 |

(Continued)

*Primary Examiner*—Thomas Denion
*Assistant Examiner*—Douglas J. Duff
(74) *Attorney, Agent, or Firm*—Patent Central LLC; Stephan A. Pendorf; William G. Anderson

(57) ABSTRACT

The invention relates to an exhaust-gas turbocharger (1) as well as in particular a guide apparatus (13) for an exhaust-gas turbocharger (1). The guide apparatus (13) can have a ring of guide vanes (8), which are pivotable on a vane bearing ring (12) by vane studs (18). The vane studs (18) can be each attached to a vane lever (11). The vane levers (11) can have vane-lever-connectors (17, 10, 46, 47), which interact with unison-ring-connectors (16, 10, 57) of a unison ring (9) which is pivotable with respect to the vane bearing ring (12) in a way, that pivoting the unison ring (9) with respect to the vane bearing ring (12) results in a synchronous movement of one or more of the vane levers (11) and guide vanes (8). The unison ring (9) can be radially supported on axial bosses (14) of several vane levers (11).

23 Claims, 12 Drawing Sheets

U.S. PATENT DOCUMENTS

| | | | |
|---|---|---|---|
| 6,951,450 B1 * | 10/2005 | Figura et al. | 417/407 |
| 7,001,143 B2 * | 2/2006 | Vogiatzis | 415/163 |
| 7,114,919 B2 * | 10/2006 | Scholz et al. | 415/164 |
| 7,117,596 B2 * | 10/2006 | Ohishi | 29/889.7 |
| 7,137,778 B2 * | 11/2006 | Marcis et al. | 415/163 |
| 7,186,077 B2 * | 3/2007 | Daudel et al. | 415/164 |
| 2002/0119042 A1 * | 8/2002 | Yoshimura et al. | 415/164 |
| 2004/0096317 A1 * | 5/2004 | Scholz et al. | 415/160 |
| 2005/0226718 A1 * | 10/2005 | Marcis et al. | 415/163 |
| 2007/0107426 A1 * | 5/2007 | Castan | 60/602 |

* cited by examiner

EXHAUST-GAS TURBOCHARGER, REGULATING DEVICE FOR AN EXHAUST-GAS TURBOCHARGER AND VANE LEVER FOR A REGULATING DEVICE

BACKGROUND OF THE INVENTION

1. Field of the Invention

The invention relates to an exhaust-gas turbocharger with variable turbine geometry, a regulating device for an exhaust-gas turbocharger as well as a vane lever for a regulating device of an exhaust-gas turbocharger.

2. Discussion of the Related Art

In turbo machines in which the turbine drives the compressor or charger it is often advantageous to regulate the exhaust-gas stream going into the turbine to improve efficiency, responsiveness or the operating range. This can be achieved by a variable geometry of the nozzle channels leading to the turbine wheel. These nozzle channels with variable geometry can be generated by a ring of pivotable guide vanes, which allow adjusting the channels in between themselves. The construction of the regulating device driving the pivotable vanes is crucial to prevent the vanes or the regulating device from seizing.

U.S. Pat. No. 2,860,827 and U.S. Pat. No. 4,179,247 show proposals how to prevent seizing of the regulating device for the guide vanes. However, neither of the two constructions is suitable for the temperature variations as they occur in modern combustion engines within the turbine housing or the components of the regulating device. Moreover the bearing assembly of U.S. Pat. No. 4,179,247 is comparatively complicated to assemble.

From the company's internal state of the art an exhaust-gas turbocharger with variable turbine geometry is known. It is shown in FIG. 9 through 12.

The principle construction of this exhaust-gas turbocharger according to the company's internal state of the art is illustrated in FIG. 9. Components of the exhaust-gas turbocharger according to FIG. 9 which are important for the comprehension of the invention described below are illustrated in FIG. 10 through 12.

The exemplary exhaust-gas turbocharger (1) according to the company's internal state of the art features a housing consisting of a bearing housing (3) and turbine housing (2), with a pivoting shaft (4). On one end the shaft (4) carries the compressor wheel (33) and on its other end the turbine wheel (5). Within the turbine housing (2) on the side of the turbine wheel (5) a volute (6) is formed which in radial direction evolves into a throat (7). Inside the throat (7) adjustable guide vanes are located.

The guide vanes (8) are pivoted from a vane bearing ring (12) and from a thrust- and bearing-ring (28) which is by a spacer (29) kept at a certain distance from the bearing ring (12), and they are adjustable through an actuator (32) which actuates the unison ring (9). A rotary motion of the unison ring (9) with respect to the vane bearing ring (12) is transmitted onto the guide vanes (8) which by this means can be adjusted within a pre-determined range between the open and closed position. The entire regulating device including all its components will be referred to as guide apparatus (13).

The flow channels of the circular throat (7) in which the exhaust gas flows radially are constituted by the spacing between the guide vanes (8). Through variation of the angular position of the guide vanes (8) the flow channels are adjustable.

FIGS. 10 through 12 show the guide vanes (8) which are mounted to the vane bearing ring (12) by means of vane studs (18), which penetrate the vane bearing ring (12) and which carry a vane lever (11) on the end opposing the guide vanes (8).

The unison ring (9) which serves the simultaneous actuation of all the vane levers (11) is located within the axial plane of the circular arranged vane levers (11) above. For the actuation of all vane levers (11) the unison ring (9) features engaging means on its inner rim which interact with suitable engaging means on each of the vane levers (11) such that during rotation of the unison ring (9) with respect to the vane bearing ring (12) all vane levers (11) and therewith the guide vanes (8) are simultaneously rotated.

The unison ring (9) carries as means for the actuation an actuator lug (15) which is connected to the actuator (32) enabling the adjustment of the unison ring (9) from outside of the housing.

As illustrated in FIGS. 11 and 12 the unison ring (9) is supported by six rollers (31), which serve the radial guidance of the unison ring (9).

The rollers (31) in turn are held in position by a cage (30) which is pivoted inside the turbine housing (2). The cage (30) features bores in which the rollers (31) are pivoted.

This arrangement functions satisfactorily as long as there are no major temperature variations. However modern exhaust-gas turbochargers are exposed to extreme temperature variations. The turbine components and adjacent parts can reach temperatures as high as 900° C. These temperature changes in connection with the extremely high revolution speed of the turbine wheel and the compressor wheel strain all the components and result in a high level of wear and in the worst cast failure of the exhaust-gas turbocharger.

In this context it is of high importance to keep the geometric arrangement of all interacting parts like vane bearing ring, unison ring, rollers, vane studs, actuator lugs etc. constant at a level which allows adjusting the guide vanes under all temperature and operational conditions.

From EP 1 357 255 A1, which is the bases for the invention, an exhaust-gas turbocharger with a guide apparatus with a ring of adjustable guide vanes is known. The guide vanes are pivoting on a vane bearing ring by means of vane studs.

The vane studs penetrate the vane bearing ring axially. They are one to one torque proof connected to one of the guide vanes as well as one of the vane levers.

In order to reduce wear during large temperature variations while maintaining a simple design EP. 1 357 255 A1 proposes to support the unison ring through the vane lever radially. In a preferable embodiment the vane levers feature axial lugs serving as radial bearing. In this case a rolling movement between the unison ring and the radial bearing area occurs.

Although this style of radial support of the unison ring with axial lugs of the vane levers has basically proven to be robust, further improvements are desirable.

SUMMARY OF THE INVENTION

The goal of the invention is to provide an exhaust-gas turbocharger as described above with a guide apparatus, which guarantees a reliable actuation of the guide vanes under all operational conditions. Furthermore a suitable vane lever for such a guide apparatus needs to be provided.

An exhaust-gas turbocharger according to the invention includes a guide apparatus with a ring of guide vanes. The guide vanes are pivoted on a vane bearing ring through vane studs, in which e.g. the vane studs axially penetrate the vane bearing ring. The vane studs are each connected torque proof to the guide vane. The vane levers feature a vane-lever-engagement-means which in connection with corresponding unison-ring-engagement-means enable a rotational movement of the unison ring with respect to the vane bearing ring resulting in a rotational movement of all vane levers and with that synchronously a rotational movement of the guide vanes.

The invention is based on the idea to support the unison ring in radial direction directly on the vane levers herewith completely avoiding the necessity of a separate support in form of studs, pins, rollers, ball bearings and such. The support and bearing of the unison ring is hereby constituted by axial, circularly curved bosses on several vane levers. Naturally it is most advantageous when all vane levers feature such an axial boss. The bearing and support through the bosses is constituted by the inner rim of the unison ring, which is at least in the range of the suspension circularly curved, on a corresponding curvature on the perspective axial boss of the vane levers.

Through this a simplified design of the guide apparatus is achieved, resulting in an increased ease of assembly and functional safety during operation.

The invention also includes that at least one of the a vane-lever-engagement-means features a lever stud engaging with a sliding block which is preferably pivoting on said lever stud, in which a corresponding unison-ring-engagement-means for said vane-lever-engagement-means features at least one recess in which the sliding block is movable, preferably in radial direction.

In another possible alternative embodiment an arrangement is used, in which at least one of the unison-ring-engagement-means features a unison ring stud engaging with a sliding block in which a corresponding vane-lever-engagement-means for said unison-ring-engagement-means features at least one recess in which the sliding block is movable.

For the expert it goes without saying that within one and the same exhaust-gas turbocharger respectively guide apparatus a part of the corresponding vane-lever-engagement-means/unison-ring-engagement-means-pairs could be of the former or the latter configuration without principally changing or least of all compromising the function of the guide apparatus.

In the vane-lever-engagement-means/unison-ring-engagement-means-pair of the former configuration the vane levers preferably feature a radially outwards aligned lever, with an axial lever stud (and which as the case may be carries the above mentioned axial boss).

In the vane-lever-engagement-means/unison-ring-engagement-means-pair of the latter configuration the unison ring stud is preferably aligned in axial direction. These two embodiments of the invention enable the sliding block to move in the corresponding recess virtually free from parasitic forces.

In the first case (lever with axially aligned lever stud) the axial support respectively fixing of the unison ring takes place to the one side through the vane levers to avoid an extensive surface contact to the turbine housing and to the other side through the bearing housing. The bearing housing acts as lateral support for the sliding blocks which are (usually) just loosely slipped onto the studs.

In the second case (unison ring with axially aligned unison ring stud) the sliding blocks are only supported on one side by the unison ring. To prevent the sliding blocks from falling out an additional fixture is necessary to hold them in place.

In a particular embodiment the unison ring, in the case of the lever arm with axially aligned lever stud and the sliding block slipped onto this lever stud, maybe not or not completely supported directly on the bearing housing, but with at least three disks.

In this case at least three but preferably all vane levers feature a disk which encloses the corresponding sliding block and which spans the unison ring in the range of the corresponding recess. This embodiment allows for a pre-assembly of the entire guide apparatus as cartridge. The disks additionally act as lateral support for the sliding blocks. For the case the number of rings matches the number of guide vanes the bearing housing is not used as lateral support for the sliding blocks.

In one particular embodiment the lateral stop and support for the sliding blocks in the case of the vane lever with axially aligned lever stud (e.g. with one-sided support of the sliding block against the vane lever) and for the case of the unison ring with axially aligned unison ring stud (e.g. with one-sided support of the sliding block against the unison ring) is provided by means of an (e.g. collar- or head-shaped) enlargement on the lever stud respectively on the vane stud, which in addition arrests the sliding block.

For the pre-assembly of the entire guide apparatus as a cartridge the use of a thrust/bearing-ring has proven to be advantageous. The guide vanes are thereby axially arranged between the vane bearing ring and the thrust/bearing-ring and pivotable on those rings. At least three spacers are axially arranged between the thrust/bearing-ring and the vane bearing ring, maintaining a certain distance between the two. The spacers are e.g. by means of screws attached to the thrust/bearing-ring and the vane bearing ring.

BRIEF DESCRIPTION OF THE DRAWINGS

In the following the invention will be explained in more detail with illustrations. Identical or functionally identical parts or components in these illustrations have identical reference numbers. They show.

DETAILED DESCRIPTION OF THE INVENTION

Figure 1:
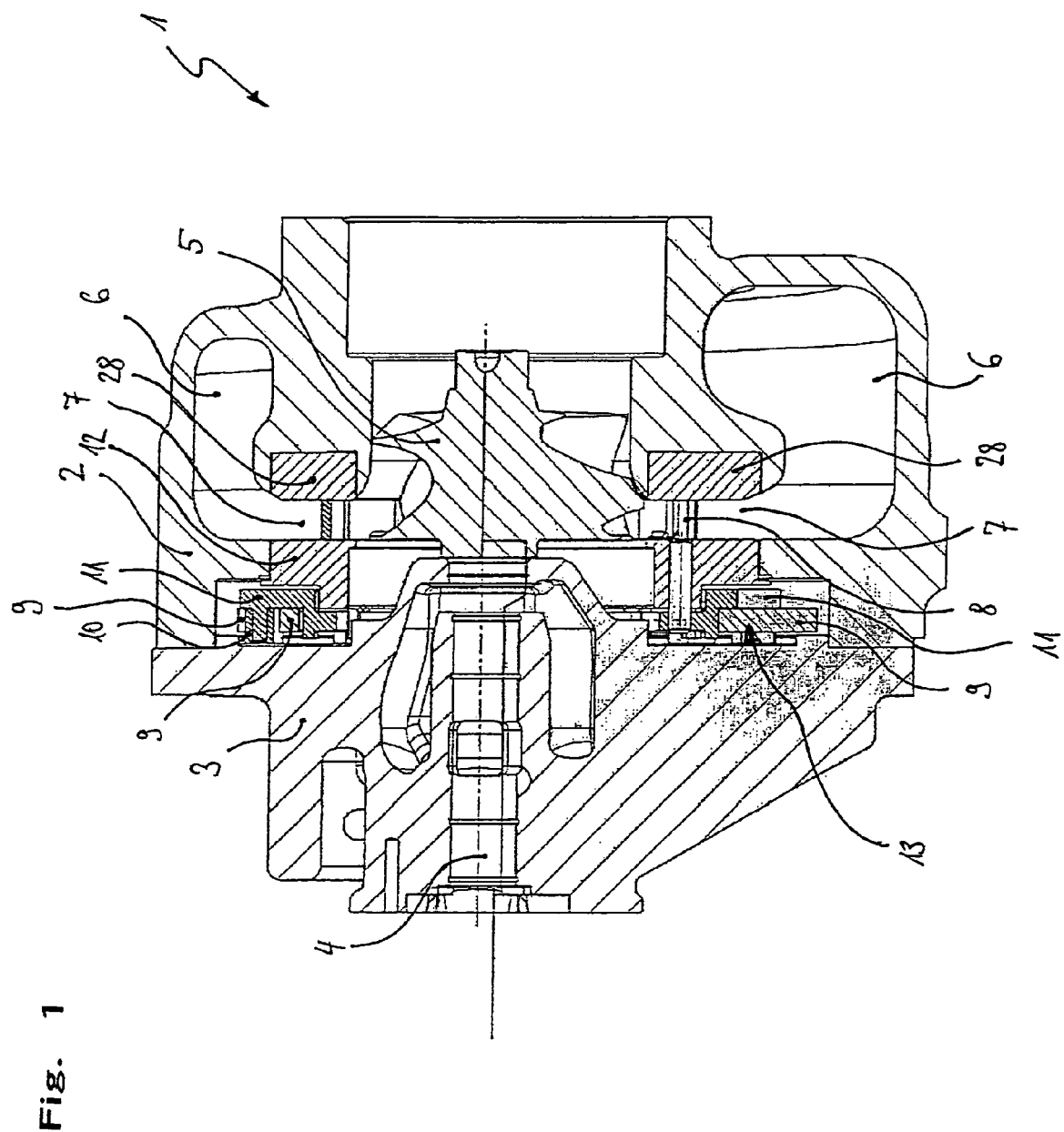
FIG. 1 A first embodiment of an exhaust-gas turbocharger according to the invention in axial cross-section.

The principle configuration of the first example of an embodiment of an exhaust-gas turbocharger is illustrated in FIG. 1.

The exhaust-gas turbocharger (1) according to the invention features a housing consisting of a bearing housing (3) and a turbine housing (2) supporting a pivotable shaft (4). On the one end the shaft (4) supports a turbine wheel (5). Within the turbine housing (2) on the side of the turbine wheel (5) a volute (6) is formed which in radial direction evolves into a throat (7).

The exhaust-gas turbocharger (1) includes a guide apparatus (13) which allows adjusting the exhaust-gas stream coming into the turbine through changing the turbine geometry. For this purpose adjustable guide vanes (8) are arranged in the throat (7).

The flow channels of the circular throat (7) in which the exhaust-gases pass through radially are constituted by the spacing between the guide vanes (8). Through variation of the angular position of the guide vanes (8) the flow channels are adjustable.

The guide vanes (8) are pivoted from a vane bearing ring (12) and from a thrust- and bearing-ring (28) which is by a spacer (not shown here) kept at a certain distance from the bearing ring (12), and they are adjustable through an actuator (not shown here) which in a way not illustrated here actuates the unison ring (9). A rotary motion of the unison ring (9) with respect to the vane bearing ring (12) is transmitted onto the guide vanes (8) which by this means can be adjusted within a pre-determined range between the open and closed position.

Figure 2:
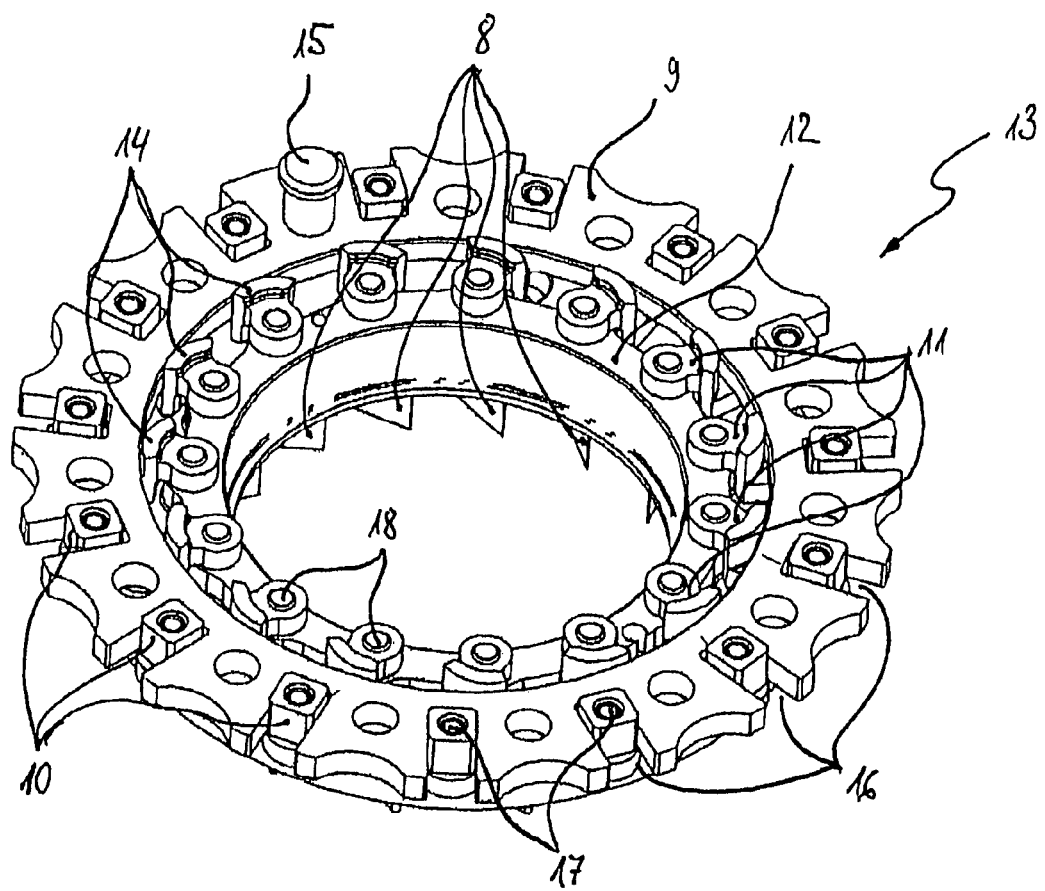
FIG. 2 The guide apparatus of the exhaust-gas turbocharger according to FIG. 1 in perspective presentation.

According to FIGS. 1 and 2 the guide vanes (8) are mounted to the vane bearing ring (12) by means of vane studs (18), which axially penetrate the vane bearing ring (12) and which carry a vane lever (11) on the end opposing the guide vanes (8).

Figure 3:
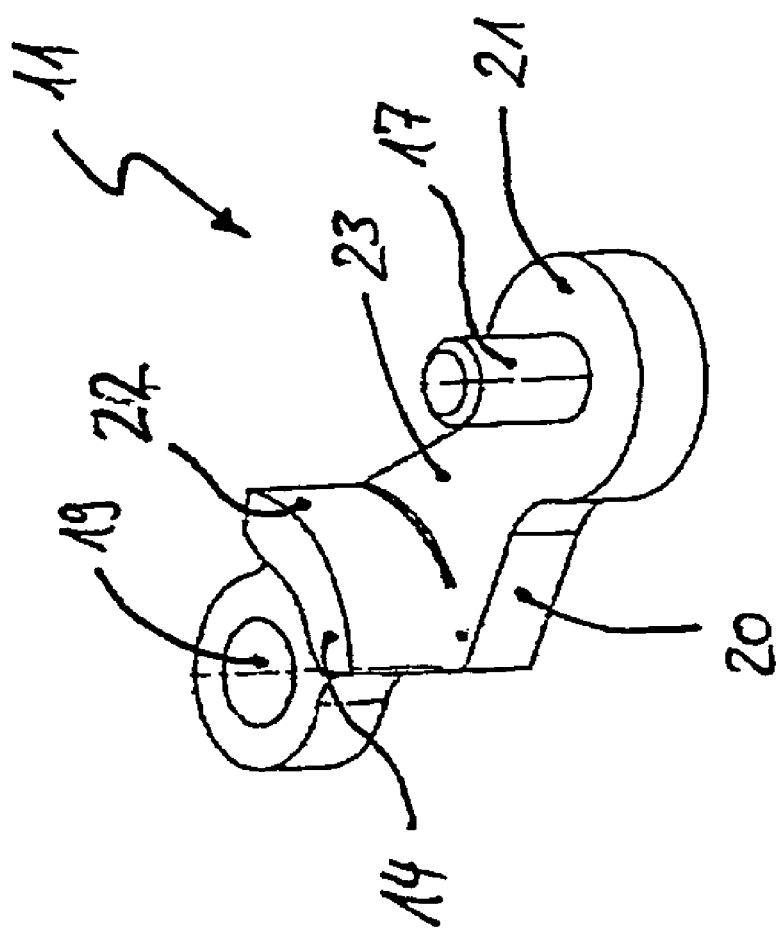
FIG. 3 A vane lever for an exhaust-gas turbocharger according to FIG. 1 respectively a guide apparatus according to FIG. 2.

FIG. 3 shows another advantageous embodiment of a vane lever (11). This vane lever (11) features a lever arm (20) with a one-to-one locating bore (19) for a vane stud (18) on one end and a lever head (21) with a lever stud (17) on the other end.

The unison ring (9) which serves the simultaneous actuation of all vane levers (11) is located within the axial level above which is constituted by the circularly arranged vane levers (11). The surface area of the lever arm (20) facing the unison ring (9) serves as axial guide face (23) supporting the unison ring (9) (compare FIG. 1).

For the actuation of all vane levers 11 the unison ring (9) features engaging means which interact with suitable engaging means on each of the vane levers (11) such that during rotation of the unison ring (9) with respect to the vane bearing ring (12) all vane levers (11) and with those the guide vanes (8) are simultaneously rotated. The unison ring (9) carries as means for the actuation an actuator lug (15) which is connected to the actuator (32) enabling the adjustment of the unison ring (9) from outside of the housing (compare FIG. 2).

The engaging means in this embodiment consists according to FIG. 1 of cuboid shaped or cubiform link blocks or sliding blocks (10) with a central bore (59). A lever stud (17) of a vane lever (11) is slipped into the central bore (59) of each corresponding link block or sliding block (10) such that one side of the sliding block (10) rests on the axial guide face (23) of the lever head (21). The sliding blocks (10) engage with suitable towards the outside aligned radial recesses (16) of the unison ring (9) constituting the guiding means of the sliding block.

In the embodiment according to FIG. 2 the sliding blocks (10) overtop the lateral face of the unison ring (9) facing the bearing housing (3) marginally in axial direction. As illustrated in FIG. 1 the axial support of the unison ring to the one side is thereby constituted by the vane levers (11), especially through the axial guide face (23) of the lever arm (20), avoiding a surface contact to the turbine housing (2) and to the other side through the bearing housing. The lateral support for the sliding blocks which are (usually) just loosely slipped onto the studs is given by axial guide faces (23) of the lever heads (21) and by the bearing housing (3).

Figure 4:
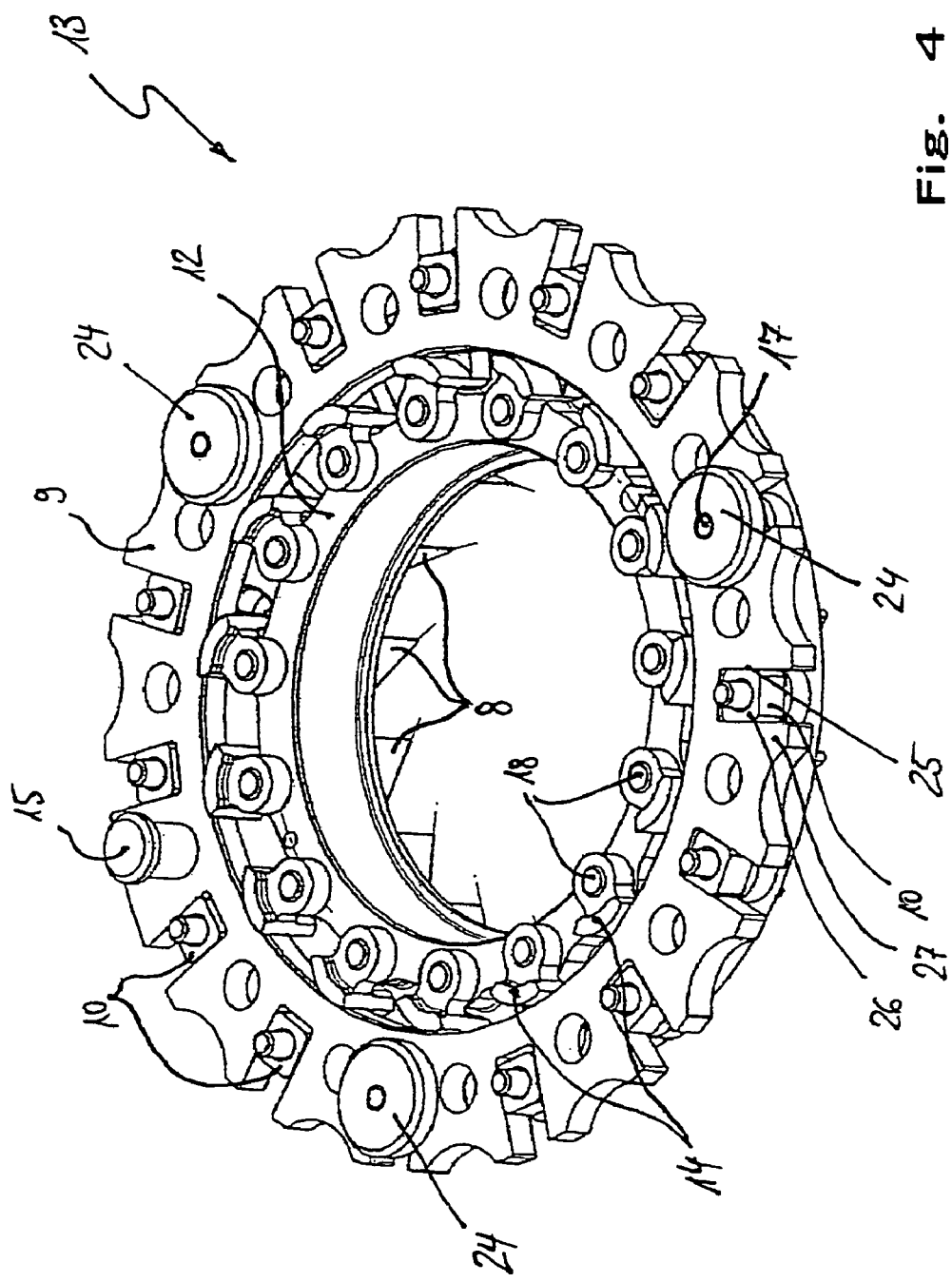
FIG. 4 An embodiment of the guide apparatus resulting from a minor modification of the guide apparatus according to FIG. 2.

In an particularly advantageous embodiment of the guide apparatus (13) shown in FIG. 4 the support of the unison ring (9) may be accomplished by at least three disks (24) which are slipped onto the lever studs (17) of three of the according vane levers (11) (preferably arranged in equal angular separation to each other), in addition to the sliding blocks (10) which are loosely slipped over the lever studs (17). At least the three sliding blocks (10) on which lever studs (17) the three (or more) discs (24) are slipped on, have mainly the same axial dimension as the unison ring (9), so that the corresponding discs (24) engage with the according sliding blocks (10) in a form fit and are supported on the unison ring (9) taking the axial play into account. The discs (24) in the embodiment at hand serve as support for the unison ring (9) as well as for the sliding blocks (10). It is possible to pre-assemble the entire guide apparatus (13) shown in FIG. 4 as a cartridge.

For the case the number of rings (24) matches the number of guide vanes (8) the bearing housing (2) is not used as lateral support for the sliding blocks.

In the two embodiments shown in FIGS. 2 and 4 the unison ring (9) is supported by the vane levers (11) enabling a radial pivoting of the unison ring (9) with respect to the vane bearing ring (12). For this purpose the vane levers (11) feature axial bosses (14) constituting a radial bearing. In this case a rolling movement is given between the inner circumference of the unison ring (9) and the circularly curved contour segments (22) of the axial bosses (14) which serve as radial support.

Figure 5:
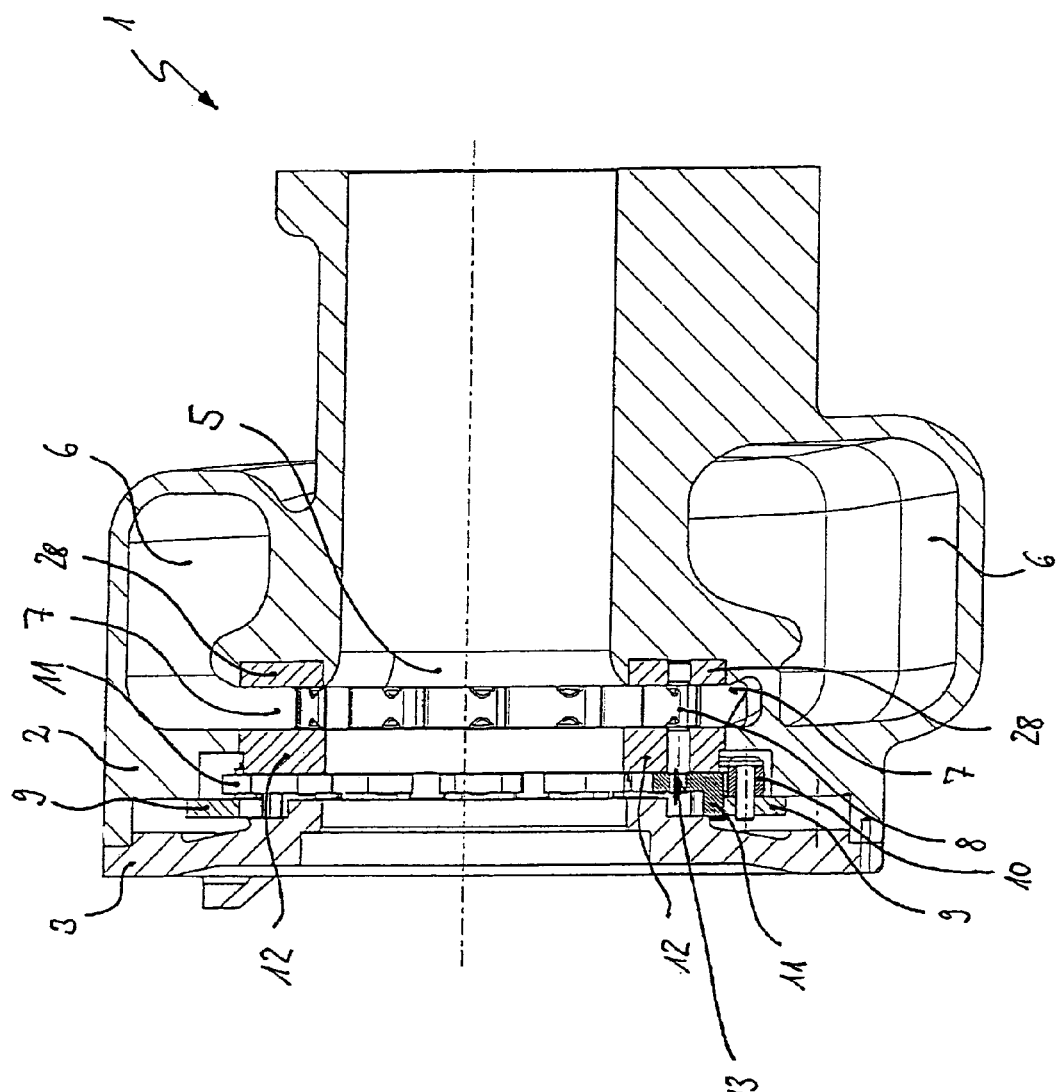
FIG. 5 An embodiment of an exhaust-gas turbocharger according to the invention in axial cross-section.

The embodiment of another exhaust-gas turbocharger (1) according to the invention is shown in FIG. 5.

The shown exhaust-gas turbocharger (1) according to the invention features a housing consisting of a bearing housing (3) and turbine housing (2). The bearing housing (3) contains a pivotable shaft which is not shown here. On one end the shaft carries a turbine wheel (5). Within the turbine housing (2) on the side of the turbine wheel (5) a volute (6) is formed which in radial direction evolves into a throat (7).

Figure 6:
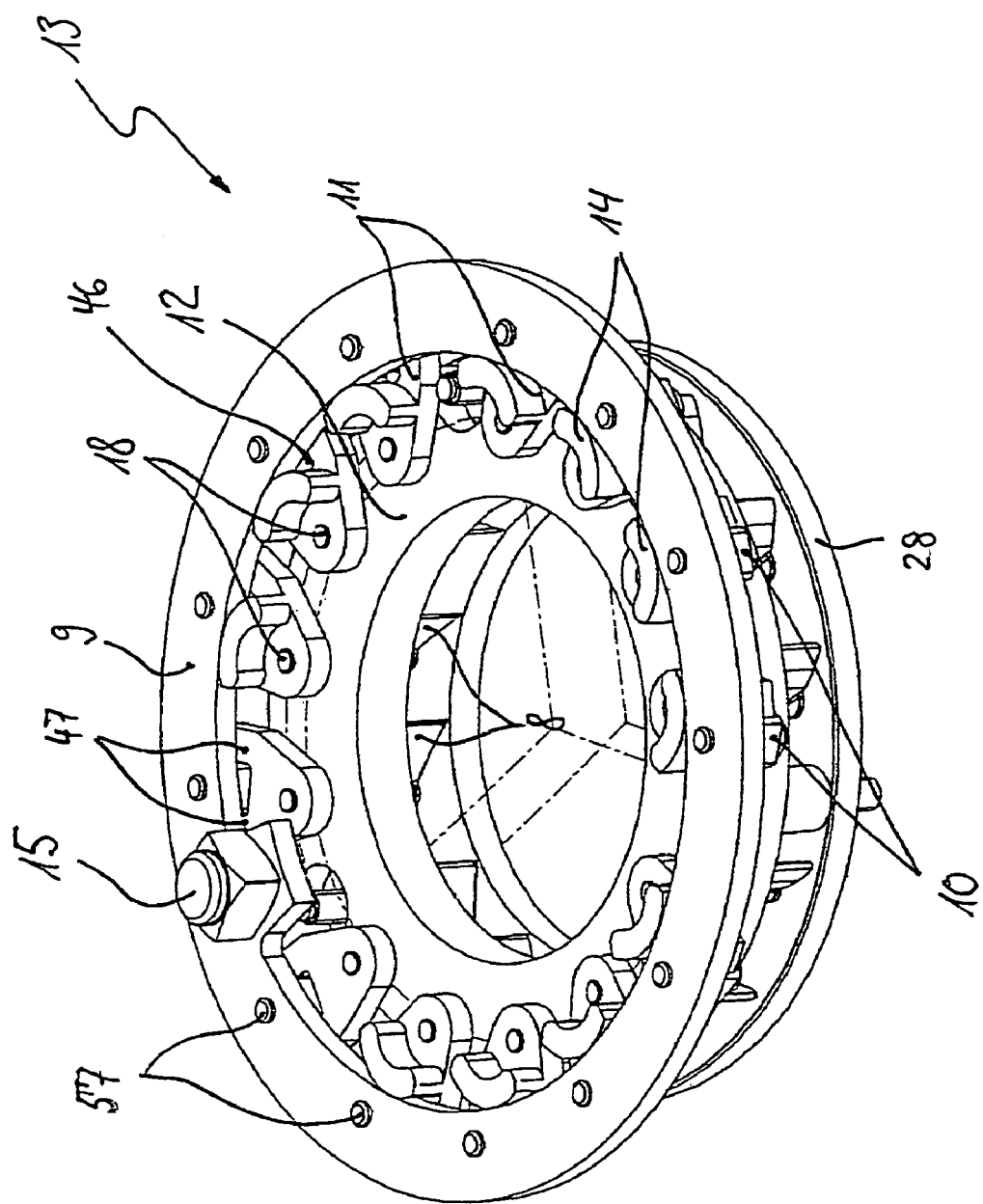
FIG. 6 The guide apparatus of the exhaust-gas turbocharger according to FIG. 5 in perspective presentation.
Figure 7:
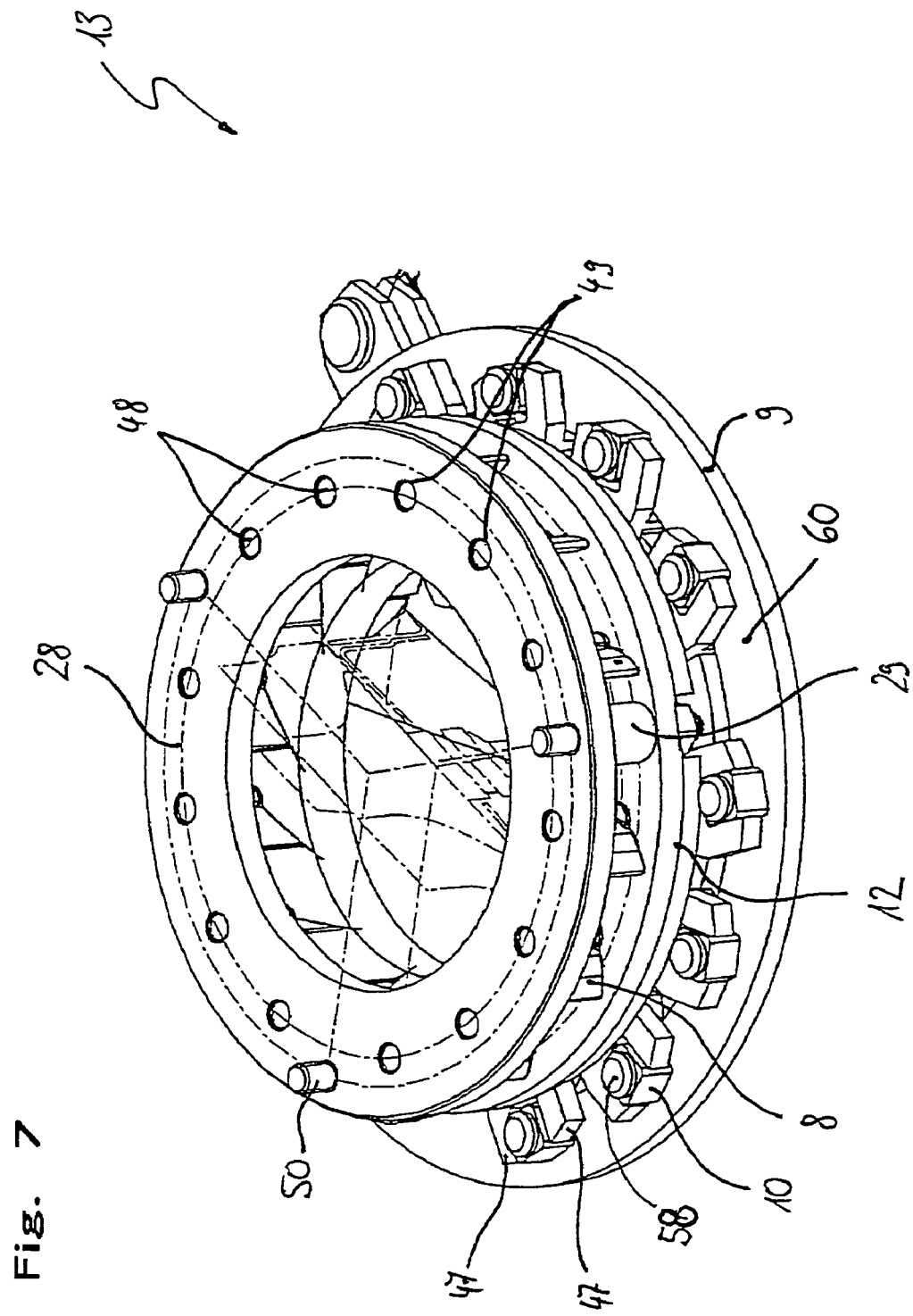
FIG. 7 The guide apparatus according to FIG. 6 in perspective presentation in a view from the turbine housing side.
Figure 8:
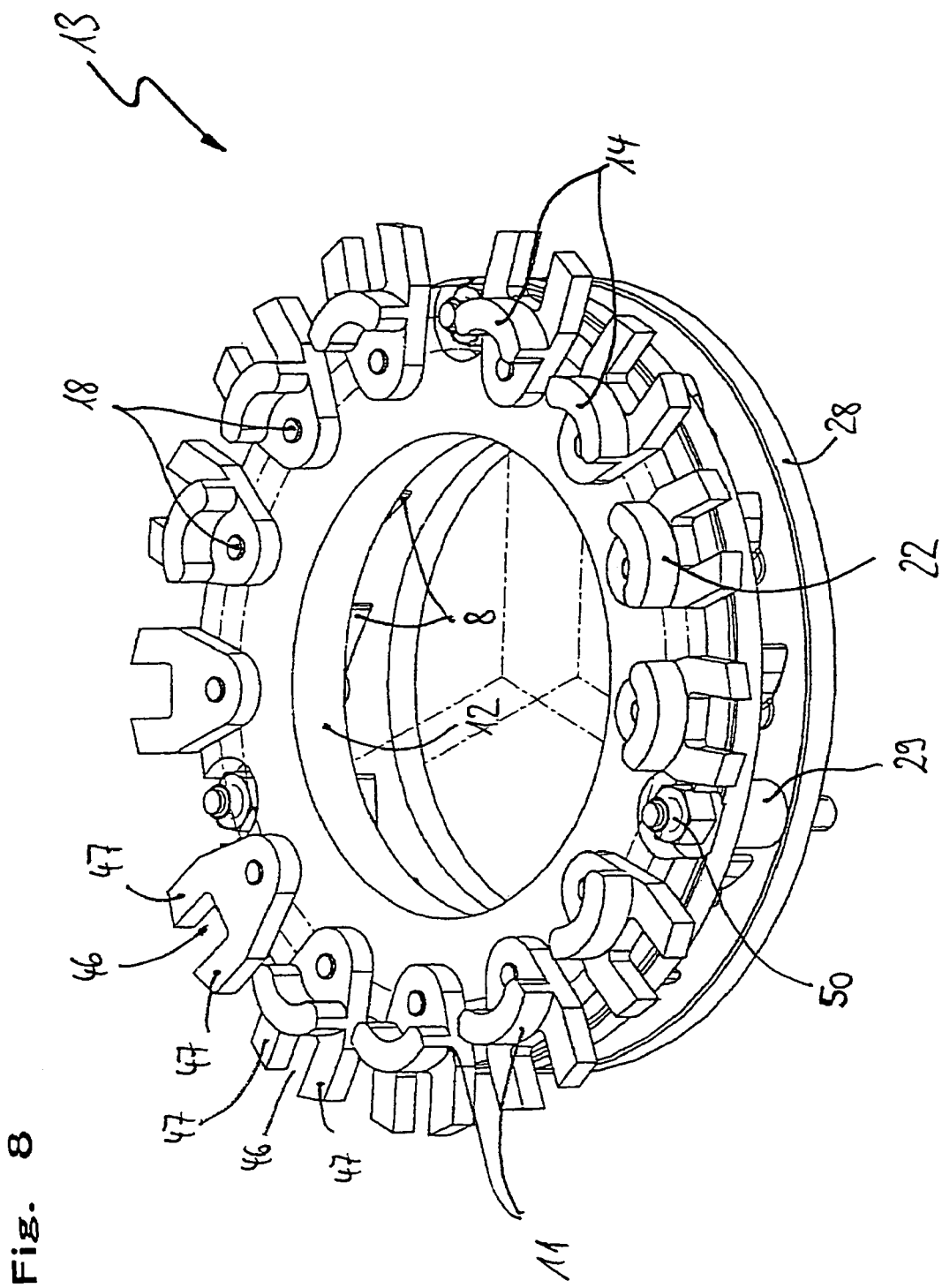
FIG. 8 The guide apparatus according to FIG. 6 shown without unison ring in perspective presentation in a view from the bearing housing.
Figure 9:
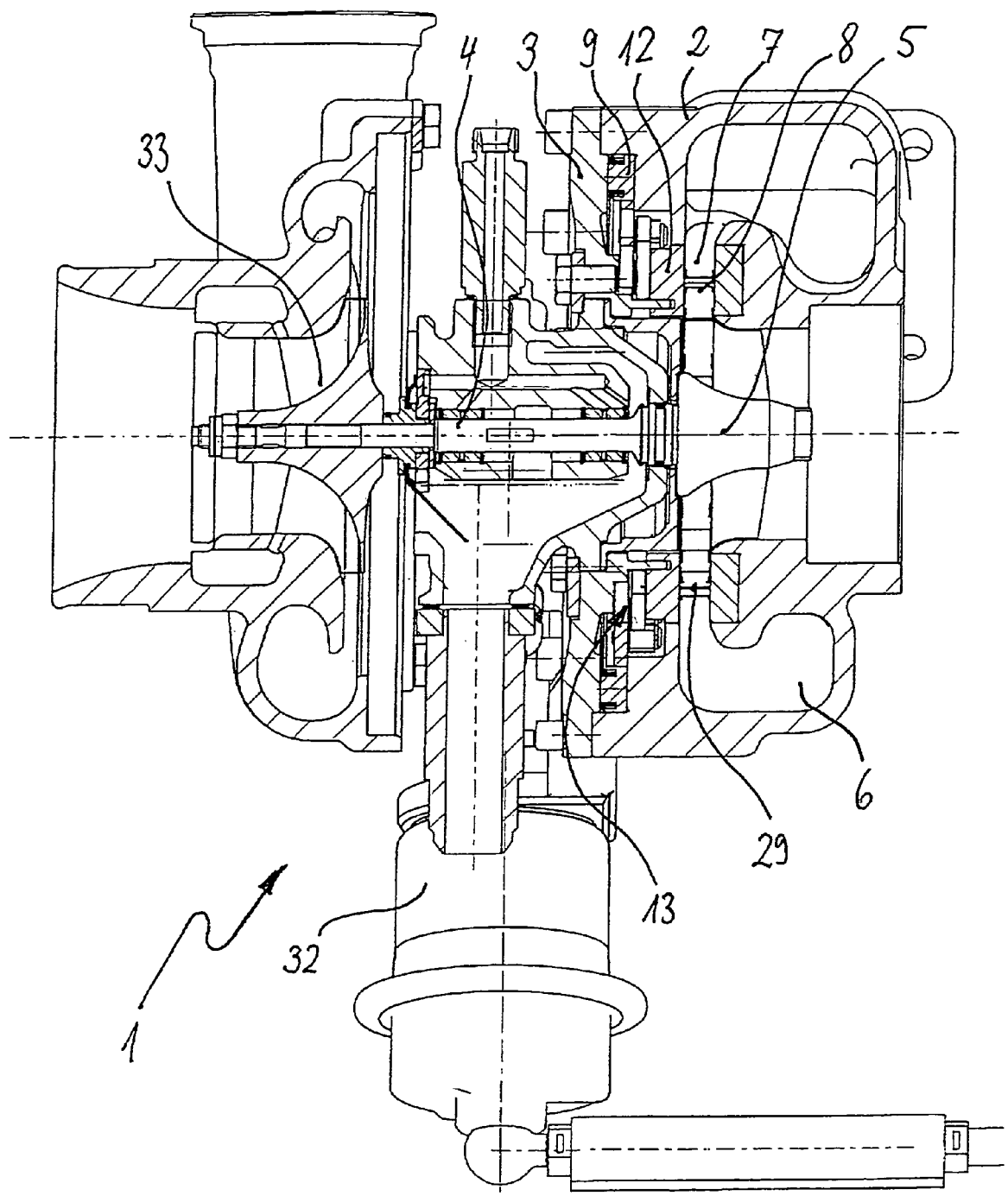
FIG. 9 An exhaust-gas turbocharger according to the state of the art in axial cross-section.
Figure 10:
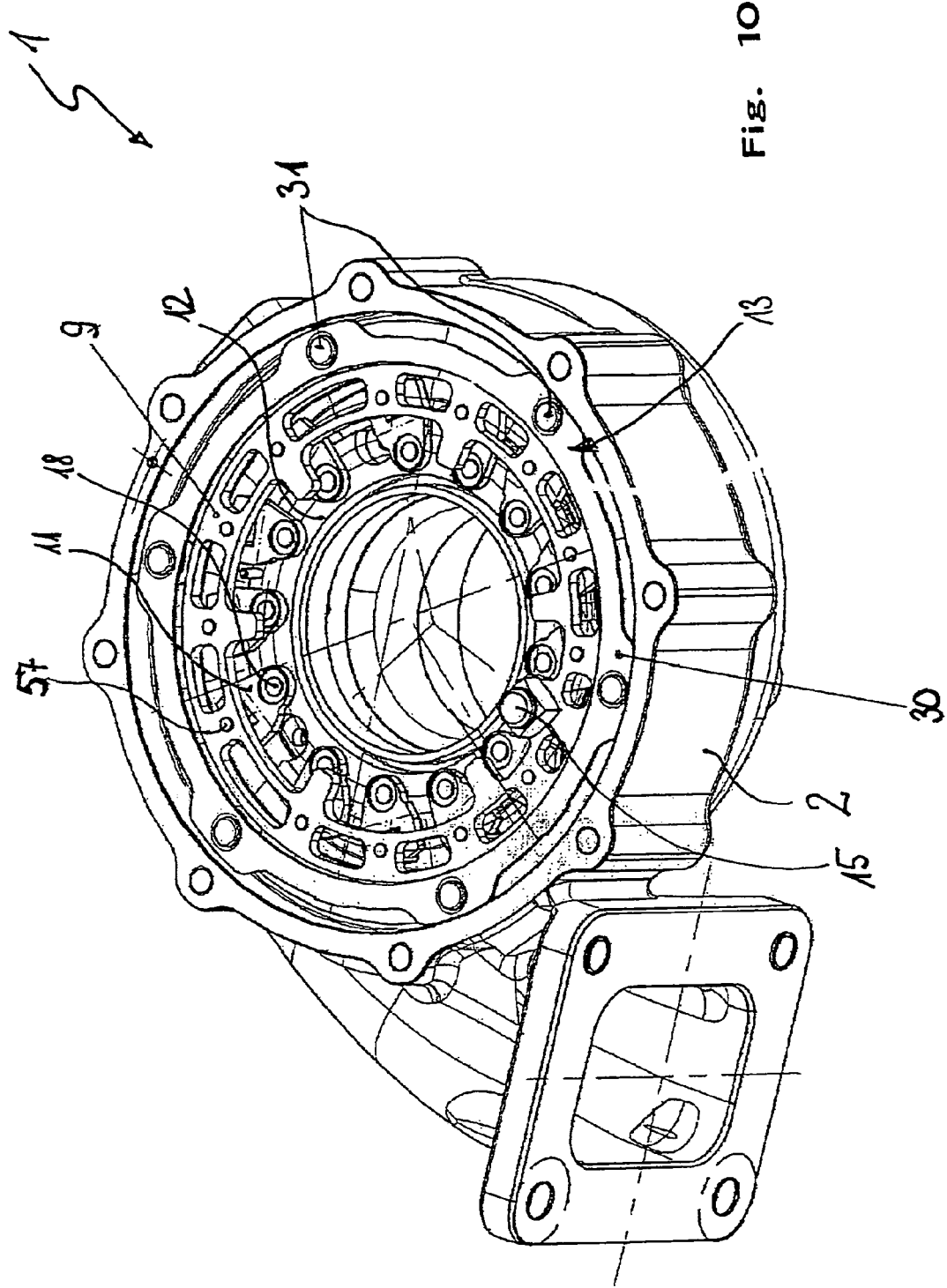
FIG. 10 The guide apparatus of the exhaust turbocharger inserted into the turbine housing according to FIG. 9 in perspective presentation in a view from the bearing housing side.
Figure 11:
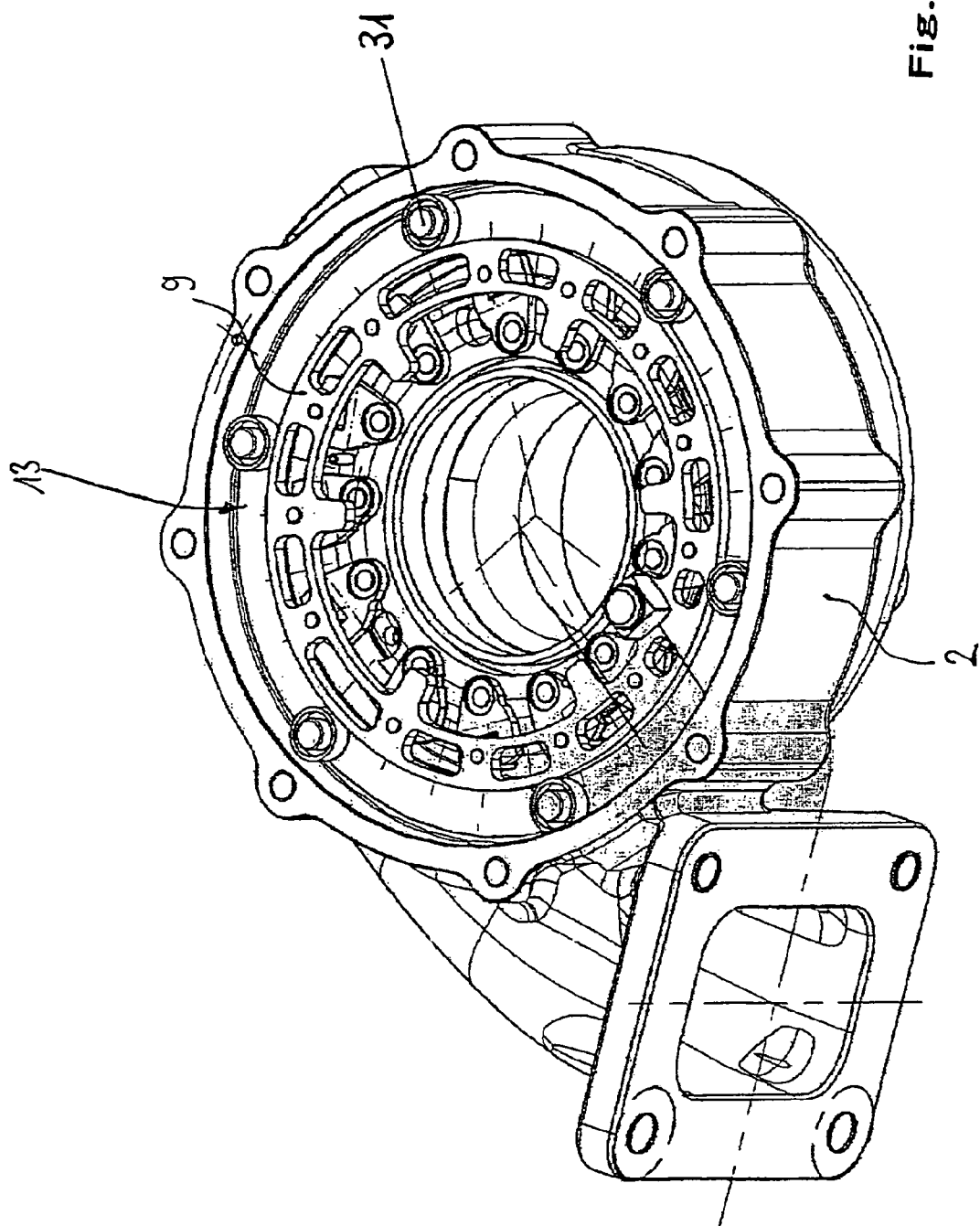
FIG. 11 The guide apparatus of the exhaust turbocharger inserted into the turbine housing according to FIG. 9 shown without the cage in perspective presentation in a view from the bearing housing side.
Figure 12:
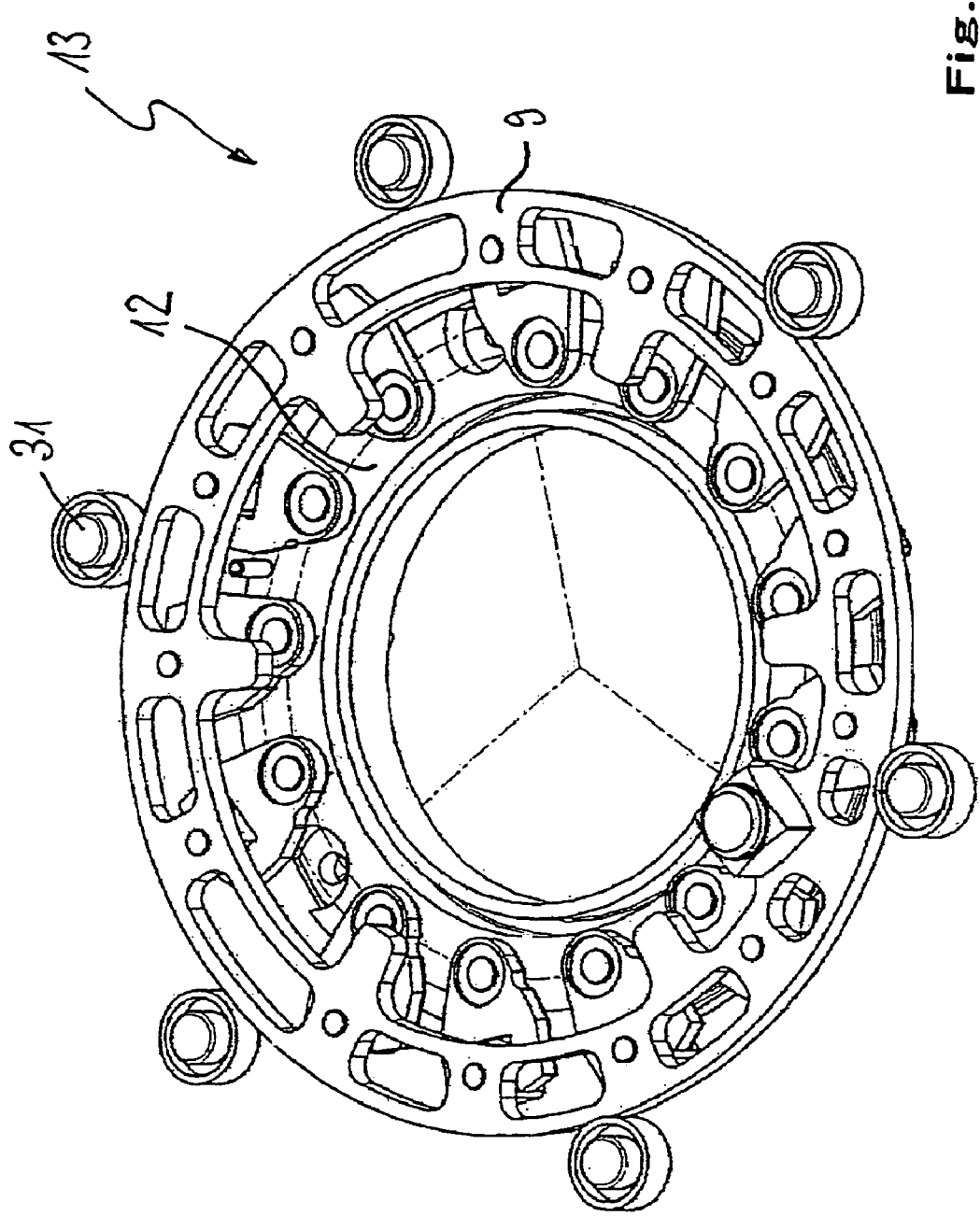
FIG. 12 The guide apparatus of the exhaust turbocharger according to FIG. 9 shown without the cage in perspective presentation in a view from the bearing housing side.

Shown from different perspectives in FIGS. 6 through 8 the exhaust-gas turbocharger (1) features a guide apparatus (13) which allows adjusting the incoming exhaust-gas flow through variation of the turbine geometry. For this purpose adjustable guide vanes (8) are arranged in the throat (7).

The guide vanes (8) are pivotable on a vane bearing ring (12) and a thrust/bearing-ring (28), and they are adjustable by an actuator (not shown here) which in a manner not shown here interacts with a unison ring (9). A movement of the pivoting unison ring (9) with respect to the vane bearing ring (12) is transmitted onto the guide vanes (8) which are as described above adjustable within a pre-determined range between the open and closed position.

As described above the guide vanes (8) are connected to the vane bearing ring (12) by means of vane studs (18) which axially penetrate the vane bearing ring (12) and which each carry a vane lever (11) on the end opposing the guide vanes (8). The guide vanes (8) are furthermore supported by the thrust/bearing-ring (28) by means of a vane bearing journal (48) fitting into an according bore of the bearing (49). Vane bearing ring (12) and thrust/bearing-ring (28) are kept at a pre-determined distance by means of (in this case three) spacers (29), ensuring low friction during pivoting of the guide vanes (8). The spacers (29) are held in place by setscrews (50) such that a modular pre-assembly of the guide apparatus (13) is possible.

FIG. 8 shows a preferred embodiment of a vane lever (11). This vane lever (11) features a lever arm (20) with a locating bore (19) for one vane stud (18) on one end and on its other end two fork-like guiding arms (47) with a recess (46) in between.

The unison ring (9) which serves the synchronous actuation of all vane levers (11) is located within the axial plane of the circularly arranged vane levers (11) above. The surface of the lever arm (20) facing the unison ring (9) serves thereby as axial/guide-face (23) for the unison ring (9) (compare FIGS. 5, 6 and 8).

In order to ensure the synchronous actuation of all vane levers (11) the unison ring (9) features engaging means which interact with suitable engaging means on each of the vane levers (11) such that during rotation of the unison ring (9) with respect to the vane bearing ring (12) all vane levers (11) and with those the guide vanes (8) are simultaneously rotated. The unison ring (9) carries as means for the actuation an actuator lug (15) which is connected to the actuator (32) enabling the adjustment of the unison ring (9) from outside of the housing (compare FIG. 6).

The engaging means in this case comprise according to FIG. 7 of cuboid shaped or cubiform link blocks or sliding blocks (10) with a central bore (not shown here). A unison ring stud (57) of a unison ring (9) (rear view shown in FIG. 6) is slipped into the central bore of each corresponding link block or sliding block (10) such that one side of the sliding block (10) rests on the axial face of the ring (60) which points into the direction of the guide vanes (8). The sliding blocks (10) engage with suitable towards the outside aligned radial recesses (46) of the vane levers (11) constituting the guiding means of the sliding blocks (10). In the example on hand the unison ring studs (57) feature a collar (58). The collar (58) serves as axial support of the sliding blocks (10).

Also in this embodiment of the invention the unison ring (9) is supported radially through the vane levers (11). This support constitutes a bearing enabling a pivoting movement of the unison ring (9) with respect to the vane bearing ring (12). For this purpose the vane levers (11) feature axial bosses (14) acting as a radial bearing. In this case a rolling movement is given between the inner circumference of the unison ring (9) and the circularly curved contour segments (22) of the axial bosses (14) which serve as radial support.

REFERENCE NUMERAL LIST

| | |
|---|---|
| 1 | exhaust-gas turbocharger |
| 2 | turbine housing |
| 3 | bearing housing |
| 4 | shaft |
| 5 | turbine wheel |
| 6 | volute |
| 7 | throat |
| 8 | guide vane |
| 9 | unison ring |
| 10 | sliding block |
| 11 | vane lever |
| 12 | vane bearing ring |
| 13 | guide apparatus |
| 14 | axial boss |
| 15 | actuator lug |
| 16 | radial recess |
| 17 | lever stud |
| 18 | vane stud |
| 19 | locating bore |
| 20 | lever arm |
| 21 | lever head |
| 22 | contour segment |
| 23 | axial guiding face |
| 24 | disc |
| 25 | form fit |
| 26 | sliding block surface |
| 27 | unison ring surface |
| 28 | thrust/bearing-ring |
| 29 | spacer |
| 30 | cage |
| 31 | roller |
| 32 | actuator |
| 33 | compressor wheel |
| 46 | recess |
| 47 | guiding arm |
| 48 | vane bearing journal |
| 49 | bore of the bearing |
| 50 | setscrew |
| 57 | unison ring stud |
| 58 | collar |
| 59 | central bore |
| 60 | face of the ring |

I claim:

1. An exhaust-gas turbocharger (1) including a guide apparatus (13) with a ring of guide vanes (8) pivoting on a vane bearing ring (12) by vane studs (18), the vane studs (18) each connected with a vane lever (11), the vane levers (11) comprising vane—lever connectors (17, 10, 46, 47), which interact with unison ring connectors (16, 10, 57) of a flat unison ring (9) which is pivotable with respect to the vane bearing ring (12) in a way, that pivoting the unison ring (9) with respect to the vane bearing ring (12) results in a synchronous movement of the vane levers (11) and the guide vanes (8), the unison ring (9) being radially supported on axial bosses (14) of one or more of the vane levers (11), wherein of the vane lever connectors comprises a lever stud (17) engaging with a sliding block (10), wherein the unison ring defines a radially oriented recess—(16) for each of the vane lever connectors, wherein each of the sliding blocks (10) is movable with the radially oriented recess (16), and wherein each of the plurality of radially oriented recesses of the unison ring is open towards a radially outward direction, wherein at least three lever studs (17) have a disc (24) which encloses a corresponding sliding block (10) from one side and which abuts the unison ring (9) in proximity to the corresponding recess (16).

2. The exhaust-gas turbocharger (1) according to claim 1, further comprising a thrust/bearing-ring (28), wherein the guide vanes (8) are axially arranged between and pivotable on the vane bearing ring (12) and the thrust/bearing-ring (28), and wherein axially between the thrust/bearing-ring (28) and the vane bearing ring (12) one or more spacers are positioned to maintain a distance therebetween.

3. A guide apparatus (13) for an exhaust-gas turbocharger (1) with a ring of guide vanes (8), which are pivotable on a vane bearing ring (12) by vane studs (18), the vane studs (18) each connected to a vane lever (11), the vane levers (11) having vane lever connectors (17, 10, 46, 47), which interact with unison ring connectors (16, 10, 57) of a flat unison ring (9) which is pivotable with respect to the vane bearing ring

(12) in a way, that pivoting the unison ring (9) with respect to the vane bearing ring (12) results in a synchronous movement of the vane levers (11) and the guide vanes (8), the unison ring (9) being radially supported on axial bosses (14) of one or more of the vane levers (11), wherein the unison ring connectors are unison ring studs (57) extending from one side only of the flat unison ring (9), each stud (57) engaging with one sliding block (10) whereby the sliding blocks are only supported on one side by the unison ring, wherein the vane lever connector corresponding with said at least one unison ring connector has a radially oriented recess (46) in which the sliding block (10) is positioned, and wherein at least a portion of one or more of the vane levers (11) is axially positioned between the unison ring (9) and the vane bearing ring (12), wherein the unison ring and the vane bearing ring have a size and shape whereby a radial outer portion of the vane levers is accessible.

4. The guide apparatus (13) according to claim 3, wherein the each of the unison ring studs (57) are aligned axially.

5. The guide apparatus (13) according to claim 3, wherein the unison ring studs (57) have a collar (58) arresting the corresponding sliding block (10).

6. The guide apparatus (13) according to claim 3, further comprising a thrust/bearing-ring (28), wherein the guide vanes (8) are axially arranged between and pivotable on the vane bearing ring (12) and the thrust/bearing-ring (28), and wherein axially between the thrust/bearing-ring (28) and the vane bearing ring (12) one or more spacers are positioned.

7. The guide apparatus (13) according to claim 3, wherein the unison ring (9), the guide vanes (8), the vane levers (11), the vane bearing ring (12) and the sliding blocks (10) can be pre-assembled into an integral sub-assembly.

8. The guide apparatus (13) according to claim 3, wherein a thrust/bearing ring (28) is part of a sub-assembly which can be pre-assembled with the vane bearing ring.

9. The guide apparatus of claim 3, further comprising a lever arm (20) having the recess (46) on one end for the engagement with the sliding block (10).

10. The guide apparatus according to claim 9, wherein a radial contour segment (22) is formed on or connected with the lever arm (20).

11. The guide apparatus according to claim 10, wherein the radial contour segment (22) is a circularly curved contour segment of the lever arm (20).

12. The guide apparatus according to claim 10, wherein the radial contour segment (22) is an axial boss having a circularly curved contour segment in a radial direction.

13. The guide apparatus according to claim 9, wherein a flat axial guide face (23) is the unison ring (9) of the guide apparatus (13).

14. The guide apparatus according to claim 13, wherein the axial guide face (23) is adjacent to a radial contour segment (22) of the lever arm (20).

15. The exhaust-gas turbocharger (1) according to claim 1, wherein a cross-section of the unison ring has a rectangular shape.

16. The exhaust-gas turbocharger (1) according to claim 1, wherein the sliding block has a flat surface that engages with a flat surface of the recess of the unison ring connector.

17. The exhaust-gas turbocharger (1) according to claim 1, wherein the unison ring and the vane bearing ring have a size and shape whereby a radial outer portion of the vane levers is accessible.

18. The exhaust-gas turbocharger (1) according to claim 1, wherein the unison ring has an actuator lug directly connected thereto for rotation of the unison ring, and wherein the actuator lug is remote from the vane levers.

19. The exhaust-gas turbocharger (1) according to claim 1, wherein at least a portion of one or more of the vane levers (11) is axially positioned between the unison ring (9) and the vane bearing ring (12).

20. The guide apparatus of claim 3, wherein a cross-section of the unison ring has a rectangular shape.

21. The guide apparatus of claim 3, wherein the sliding block has a flat surface that engages with a flat surface of the recess of the unison ring connector or the vane lever connector.

22. The guide apparatus of claim 3, wherein the unison ring has an actuator lug directly connected thereto for rotation of the unison ring, and wherein the actuator lug is remote from the vane levers.

23. The guide apparatus of claim 3, wherein the radially oriented recess (16) is open towards a radially outward direction.

\* \* \* \* \*